United States Patent Office 3,447,623
Patented June 3, 1969

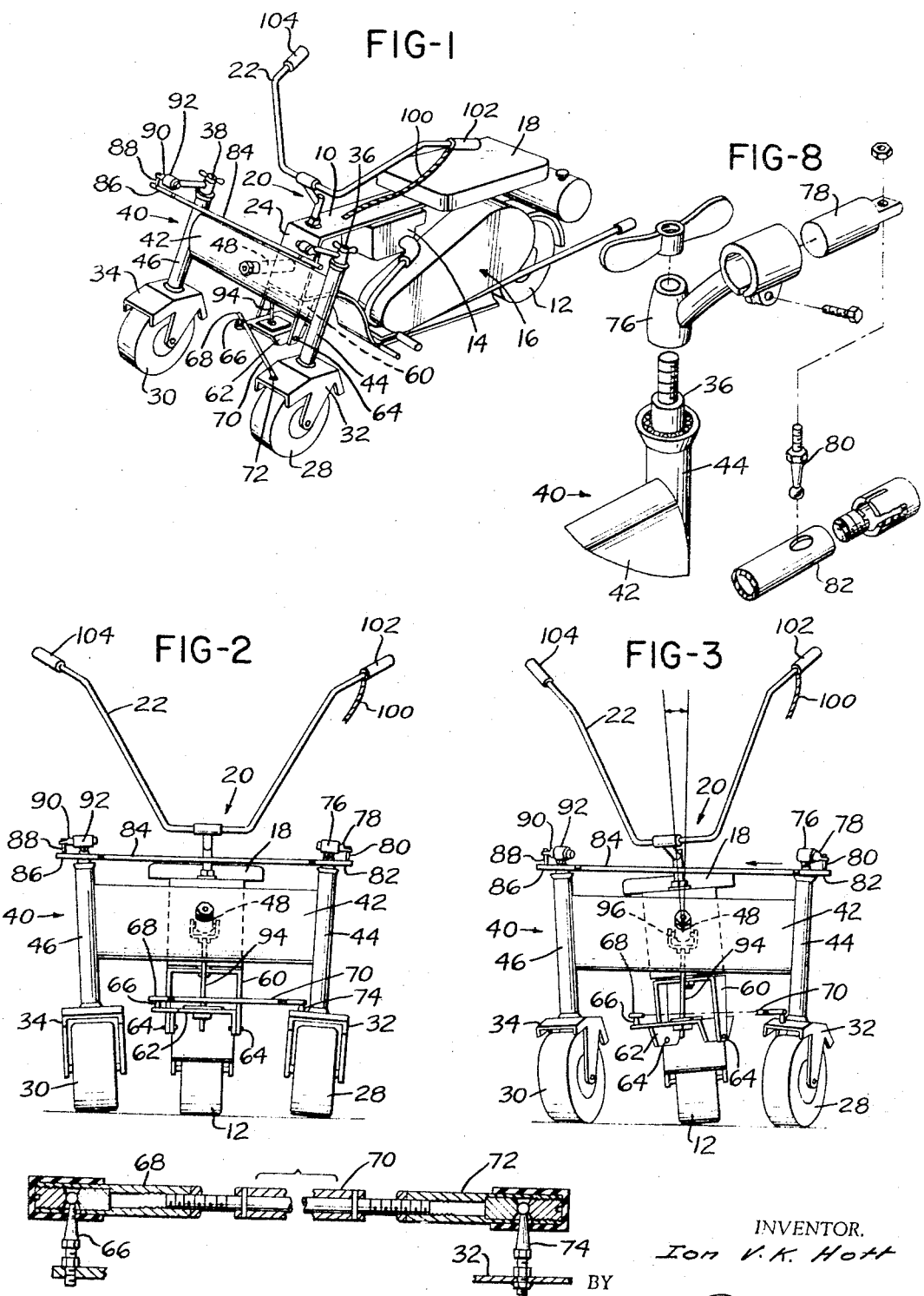

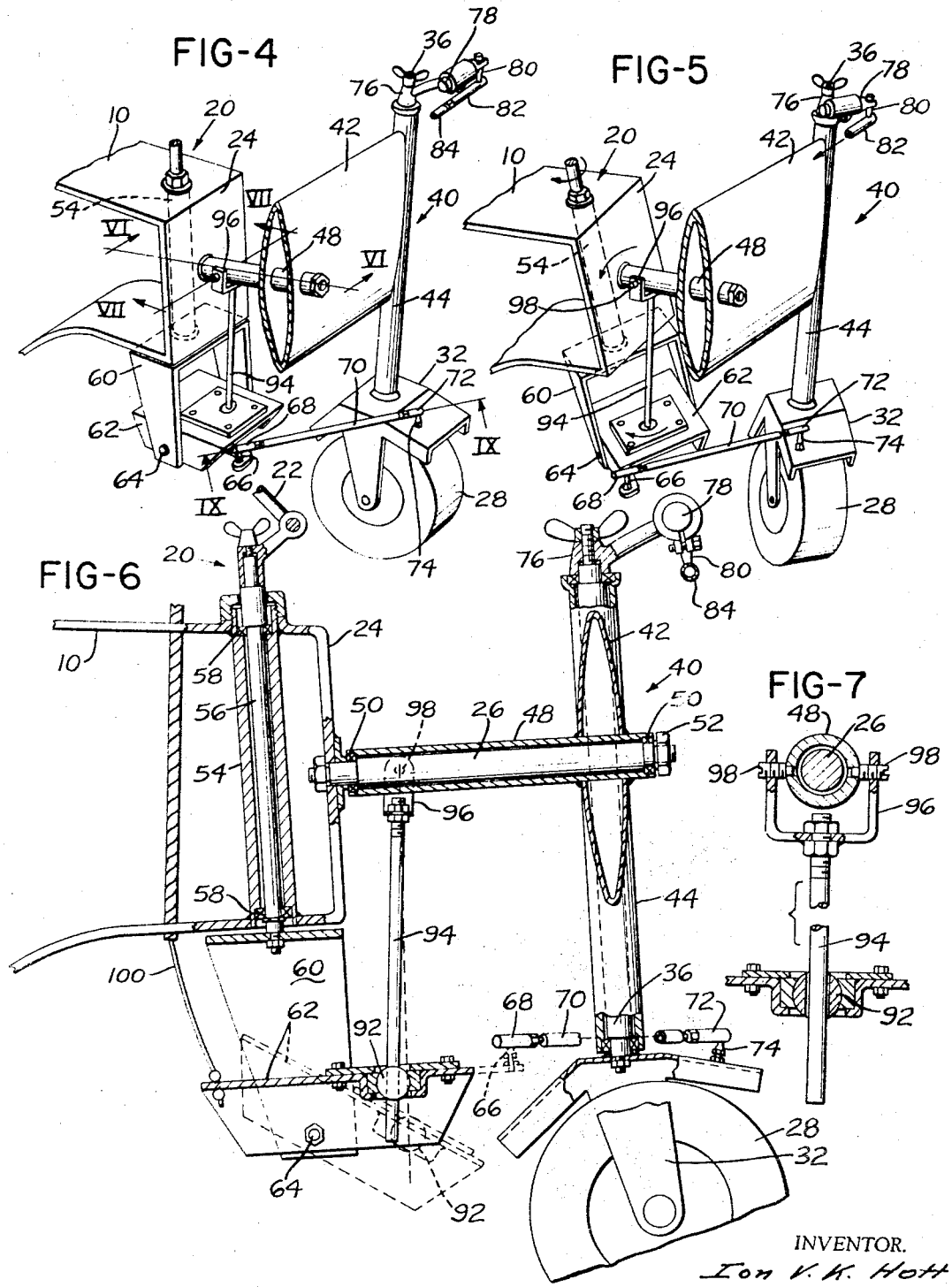

3,447,623
STEERING ARRANGEMENT FOR THREE-WHEELED SCOOTER TYPE VEHICLE
Ion V. K. Hott, Dayton, Ohio, assignor to The Joyce-Cridland Company, Dayton, Ohio
Filed Jan. 31, 1967, Ser. No. 612,960
Int. Cl. B62k 5/08; B62d 1/12, 7/16
U.S. Cl. 180—25                                    11 Claims

ABSTRACT OF THE DISCLOSURE

This invention concerns a scooter type vehicle having a single rear wheel and two laterally spaced steerable front wheels, with the main frame of the vehicle pivotally connected to a frame for the front wheels with a linkage connecting the steering mechanism with the main frame, so turning of the front wheels will cause the main frame to tilt in the direction of steering.

BACKGROUND OF THE INVENTION

Scooter type vehicles are known and, in general, have a main frame which carries a seat and an engine. A rear wheel on the frame is driven by the engine and a front wheel is steerable by the scooter operator seated on the vehicle seat. With a scooter of this nature, when a corner is turned, the scooter must be tilted in the direction of turning to maintain a stable kinematic condition, the same as is done with a bicycle or motorcycle. With a two wheeled scooter, however, the stable condition of operation that can be maintained by tilting the scooter while it is in motion, cannot be maintained when the scooter is halted or is moving at a very low speed. Under the last-mentioned condition, a two wheeled vehicle becomes unstable and must be kept upright by the operator placing one or both feet on the ground at the side of the scooter.

The scooter can be made stable when halted or moving at low speed by placing two wheels in the front or back, but when this is done, the scooter frame does not tilt in a turn and operation of the scooter in a turn not only tends to become unstable but also, the operator must lean in the direction of turning to maintain a feeling of comfort. The higher the scooter speed, the more pronounced the foregoing disadvantages of a non-tiltable scooter frame become.

DESCRIPTION OF THE INVENTION

The present invention proposes a scooter construction in which stable conditions of operation prevail whether the scooter is halted or moving, and whether the scooter is moving at low speed or at high speed.

More especially, the present invention proposes a three wheel construction for scooters in which the disadvantages referred to in connection with previous three wheel scooters are eliminated.

The present invention provides a three wheel scooter with two steerable front wheels in which turning of the front wheels to effect steering of the scooter will cause tilting of the scooter frame rearwardly of the front wheels in the direction of steering so that the scooter is kinematically stable under all conditions of operation.

Further, according to the present invention, the degree of tilt of the scooter frame for any given degree of turning of the front wheels of the scooter can be varied to adapt the degree of tilt of the scooter frame to the speed of the scooter.

The nature of the present invention will become more apparent upon reference to the following detailed specification, taken together with the accompanying drawings, in which:

FIGURE 1 is a perspective view of a three wheel scooter according to the present invention;
FIGURE 2 is a front view of the scooter;
FIGURE 3 is a front view like FIGURE 2, but showing the front wheels turned and the scooter frame correspondingly tilted;
FIGURE 4 is a fragmentary perspective view showing the steering and frame tilting mechanism;
FIGURE 5 is a view like FIGURE 4, with the mechanism adjusted to a different position;
FIGURE 6 is a vertical longitudinal section indicated by line VI—VI on FIGURE 4 and drawn at enlarged scale;
FIGURE 7 is a section on line VII—VII on FIGURE 4;
FIGURE 8 is a fragmentary blown-up perspective view showing the connection of the steering mechanism to the spindle of one of the steerable front wheels; and
FIGURE 9 is a section indicated by line IX—IX on FIGURE 4 and showing the drag link leading from the steering column to one of the steerable front wheels.

Referring to the drawings more in detail, the scooter comprises a frame 10 which carries a single ear wheel 12; an engine 14; a drive train 16, such as a chain drive which connects the engine 14 with wheel 12; a seat 18; a steering column 20; and a steering device on the upper end of column 20, such as handlebars 22. The foregoing parts form an assembly which tilts as a unit when the scooter turns a corner, as will be explained hereinafter.

The frame 10 comprises a front portion 24 which inclines outwardly toward the bottom and to which, in about the middle, is fixedly attached one end of a shaft 26 (FIG. 6). Shaft 26 is substantially perpendicular to portion 24 and thus has its axis inclined upwardly toward the front of the scooter.

The two front wheels of the scooter, indicated at 28 and 30, are carried in respective forks, 32 and 34, with each fork having a respective upwardly extending spindle 36, 38. A frame 40 is provided for the front wheels and comprises a transverse flattened tubular central portion 42 having fixed to its ends the upwardly extending cylindrical portions 44 and 46 which rotatably receive the spindles 36 and 38, respectively.

Frame 40 also has fixed thereto in about the middle the tubular element 48 through which shaft 26 extends. Bearings 50 are arranged between shaft 26 and element 48 at opposite ends of the shaft, and a nut 52 retains element 48 on the shaft and holds it thereon against axial movement.

At this point it will be seen that the aforementioned assembly which includes frame 10 of the scooter is tiltable relative to the assembly which comprises the front wheels and their support frame about the axis of shaft 26.

As to the steering of the front wheels, steering column 20 comprises a sleeve 54 welded or brazed in frame 10, and in which shaft 56 is journalled by bearings 58. Handlebars 22 are connected to the upper end of shaft 56 while at its lower end shaft 56 has fixed thereto an inverted U-shaped bracket 60. Between the spaced lower ends of the bracket 60 there is tiltably supported a member 62 on pivot screws 64.

Member 62 has connected thereto a ball element 66 which is received in socket fitting 68 on one end of drag link 70 (FIG. 9). The other end of drag link 70 has another socket fitting 72 which receives ball element 74 secured to fork 32 of front wheel 28. It will be evident that actuation of handlebars 22 to rotate shaft 56 will cause bracket 60 and member 62 to rotate with the shaft and drag link 70 to turn fork 32, wheel 28, and wheel spindle 36 in the same direction.

The upper end of spindle 36 carries an offset fitting 76 which receives a bar 78 to which is connected ball element 80 receivable in socket fitting 82 on the adjacent end of a drag link 84. Drag link 84 extends laterally at the front of the front wheel frame and has its other end connected to spindle 38 of wheel 30 and fork 34 in the same manner by a socket fitting 86, ball element 88, bar 90, and offset fitting 92. As will be seen, drag link 84 is disposed forwardly of the axes of the wheel spindles and is connected thereto at points spaced from each spindle on the side thereof opposite the other spindle. Because of this arrangement, the moment arm connecting drag link 84 with the spindle of the wheel turning inwardly will lengthen while the moment arm connecting the drag link with the spindle of the wheel turning outwardly will shorten. This is desirable for reasons well known in connection with steering geometrics and causes the inside steered wheel in a turn to take a sharper angle than the outside steered wheel.

With further reference to the steering, it will be noted that the wheel spindles converge downwardly and are tilted forwardly toward the bottom, and that the wheel axles are disposed slightly forwardly of the respective spindle axes. Further, drag link 70 is adjustable in length while adjustment of the effective length of drag link 84 can be accomplished by adjustment of bars 78, 90 in their respective offset fittings.

Member 62, in about the middle thereof, and forwardly of the axis of shaft 56 similarly carries a ball 92 through which rod 94 slidably extends. The upper end of rod 94 carries a fork 96 which is pivoted to tubular element 48 by screws 98 so that rod 94 can swing in the plane of the axis of sleeve element 48 but is prevented from movement in a direction transverse to the axis of sleeve element 48.

Because of the aforementioned arrangement of bar 94, rotation of bracket 60 and member 62 to carry out a steering operation will tend to shift ball 92 laterally of the front wheel frame. However, ball 92 is held against such lateral movement by bar 94 which extends through the ball and which is prevented from lateral movement relative to sleeve element 48 which is, in turn, fixed to the front wheel frame. Member 62 and bracket 60 are thus constrained to rotate about the axis of rod 94 and this will cause bracket 62 in the region connected to shaft 56 to move laterally, thereby causing the entire frame assembly to tilt about the axis of shaft 26 and sleeve 48. It will be noted that the tilting of the frame assembly is in the direction of turning of the scooter, thus tending to establish stable conditions during turning of the scooter.

Member 62 is tiltable in bracket 60 so as to lengthen or shorten the moment arm through which the tilting mechanism operates so as to control the degree of tilting of the frame assembly for any given degree of turning of the scooter.

Member 62 can be tilted to a desired position and clamped but, since the forces acting on member 62 tending to change the degree of tilt thereof are small, it is practical to connect a flexible cable drive, such as Bowden wire 100 to member 62 and actuate the Bowden wire by handgrip 102 of the handlebars. In that manner, the inclination of member 62 can be adjusted by the scooter operator to adjust the tilt of the scooter to the speed at which the scooter is travelling.

It will be appreciated that changes in inclination of member 62 have a minimal effect on the steering system because of the arrangement of drag link 70. Drag link 70 may be connected to member 62 or to 60, if desired.

Handgrips 104 of the handlebars can advantageously be employed in a conventional manner to adjust the engine throttle.

Suitable anti-friction bearings are employed at all rotating wear locations and, wherever possible, bicycle type bearings are used. For example, the wheel spindles and the steering column shaft can advantageously be journalled in bicycle type anti-friction bearings.

What is claimed is:

1. In a scooter type vehicle having a frame comprising: a rear main frame portion with a seat for the driver and a rear wheel, a front frame portion, support means defining a longitudinal pivot axis with said rear wheel about which said main frame portion is tiltable, said support means connecting said front frame portion to said main frame portion and having two laterally spaced front wheels pivotally carried by said front frame portion, said front wheels being steerably connected to said rear main frame portion, steering means carried on said main frame portion for steering said front wheels and including a steering shaft rotatable in the main frame portion, manually operable means on the upper end of the steering shaft for actuation thereof by the vehicle operator, a bracket on the lower end of said steering shaft, link means connected to said bracket at a point displaced radially from the axis of said steering shaft and also connected to one of said front wheels, said front wheels being interconnected to turn in unison so rotation of the steering shaft will turn said front wheels to steer the vehicle, and control means comprising tilting means connected to said steering means and to said front frame portion for automatically tilting said rear main frame portion in the direction of and in response to the turning of said front wheels and operable in response to actuation of said steering means to cause said main frame portion to tilt about said pivot axis and in the direction of turning of said front wheels, said control means including a control member connected to said bracket at a point spaced from the axis of said steering shaft to said front frame portion whereby as said steering shaft is rotated to steer the vehicle the main frame portion is caused to tilt about said pivot axis relative to the front frame portion.

2. A scooter type vehicle according to claim 1 in which said control member is connected to said bracket forwardly of the axis of said steering shaft and extends laterally therefrom to said front frame portion so the main frame portion is constrained to tilt in the direction of turning of the front wheels.

3. A scooter type vehicle according to claim 2 in which the connection of said control member to said bracket is in the form of a plate member supported on said bracket for tilting movement therein about an axis transverse to the axis of said steering shaft, a ball rotatably mounted in the plate member forwardly of the axis of said steering shaft and having a hole therethrough, said control member comprising a rod extending slidably through the hole in said ball, and the connection of said rod to said front frame portion being in the form of an attachment element fixed to the upper end of said rod and pivoted to said front frame portion on a transverse axis, said plate member being tiltable in the bracket to vary the degree of tilt of the main frame portion for a given degree of turning said front wheels.

4. A scooter type vehicle according to claim 3 in which said manually operable means has an adjustable element thereon, and a flexible drive leading from said adjustable element to said plate member so that said adjustable element can be adjusted to change the tilted position of said plate member in said bracket.

5. A scooter type vehicle according to claim 2 in which said support means is in the form of a shaft element fixed to the front end of said main frame portion and projecting forwardly therefrom and a sleeve fixed to said front frame portion and rotatably receiving said shaft element, said attachment element comprising a fork embracing said sleeve and pivoted thereto for swinging movement in the fore and aft direction only of said front frame portion.

6. A scooter type vehicle according to claim 5 in which the front end of said main frame portion and said front frame portion are inclined backwardly toward the top and said shaft element and sleeve incline downwardly toward the rear of the vehicle.

7. A scooter type vehicle according to claim 1 in which said front frame portion has spindle sleeves at the sides, a spindle for each front wheel extending rotatably through a respective spindle sleeve, a drag link extending laterally of the front frame portion at the top, and cranks fixedly connected to the upper ends of said spindles and pivotally connected to the adjacent ends of said drag link to cause said front wheels to turn in unison upon actuation of said steering shaft.

8. A scooter type vehicle according to claim 7 in which the pivotal connection of said cranks to said drag link when viewed in the axial direction of said spindles from above and facing in the direction of travel of the vehicle is for the right hand spindle in one of the first and third quadrants while for the left hand spindle the connection is in the fourth or second quadrants respectively.

9. A scooter type vehicle according to claim 8 in which said spindles converge toward the bottom of said front frame portion and said front wheels are rotatable on axes disposed forwardly of the plane of the axes of said wheel spindles.

10. A scooter type vehicle according to claim 7 in which each crank comprises an L shaped member having one leg fixed to a respective spindle and the other leg disposed at an angle to the axis of the respective spindle and a bar axially adjustably mounted in the outer end of said other leg and extending in a direction transverse to said other leg, and means on the end of said bare effecting said pivotal connection of the respective crank to said drag link.

11. In a scooter type vehicle having a frame comprising: a rear main frame portion including therewith a seat for the driver, an engine, a rear wheel, and drive means connecting said engine with said rear wheels, a front frame portion, support means defining a longitudinal pivot axis with said rear wheel about which said main frame portion is tiltable, said support means connecting said front frame portion to said main frame portion and having two laterally spaced front wheels pivotally carried by said front frame portion, said front wheels being steerably connected to said rear main frame portion, steering means carried on said main frame portion for steering said front wheels and including handle bars on said steering means operable from said seat, a rotatable hand grip on said handle bars, and control means comprising tilting means adjustable to adjust the degree of tilt of the main frame portion for a given degree of turn of said front wheels and connected to said steering means and to said front frame portion in the direction of and in response to the turning of said front wheels and in response to actuation of said steering means to cause said main frame portion to tilt about said pivot axis and in the direction of turning of said front wheels, said control means including means connecting said hand grip with said tilting means for adjustment thereof in response to angular adjustment of said hand grip.

References Cited

UNITED STATES PATENTS 1,283,942   11/1918   Spanovic _____ 280—269
2,029,735   2/1936    Minott _____ 280—112

FOREIGN PATENTS 7,163       1892      Great Britain.
426,120     10/1947   Italy.
1,063,473   8/1959    Germany.

KENNETH H. BETTS, *Primary Examiner.*

U.S. Cl. X.R.

280—95, 111, 269